THIN FILM MAGNETOMETER EMPLOYING PHASE SHIFT DISCRIMINATION

Filed April 19, 1965 4 Sheets-Sheet 1

INVENTORS.
RICHARD L. FUSSELL
CLIFFORD J. BADER
BY
Francis A. Varallo
AGENT

INVENTORS.
RICHARD L. FUSSELL
CLIFFORD J. BADER
BY Francis A. Varallo
AGENT

INVENTORS.
RICHARD L. FUSSELL
CLIFFORD J. BADER
BY Francis A. Varallo
AGENT

THIN FILM MAGNETOMETER EMPLOYING PHASE SHIFT DISCRIMINATION

Filed April 19, 1965 4 Sheets-Sheet 4

INVENTORS.
RICHARD L. FUSSELL
CLIFFORD J. BADER
BY Francis A. Varallo
AGENT

United States Patent Office 3,416,072
Patented Dec. 10, 1968

3,416,072
THIN FILM MAGNETOMETER EMPLOYING PHASE SHIFT DISCRIMINATION

Richard L. Fussell, Chester Springs, and Clifford J. Bader, West Chester, Pa., assignors to Burroughs Corporation, Detroit, Mich., a corporation of Michigan Filed Apr. 19, 1965, Ser. No. 449,183
6 Claims. (Cl. 324—43)

ABSTRACT OF THE DISCLOSURE

The present disclosure describes a thin magnetic film magnetometer in which the thin film field-dependent inductance is exploited as a reactive component in a tuned resonant circuit. Actual operative embodiments of the magnetometer employing the thin film transducer in a fixed frequency, phase variation mode of operation are also described in detail.

The present invention relates generally to thin films or layers of ferromagnetic material, and more specifically to the utilization of such films in a nonswitching, inductance-variation mode to provide a magnetometer transducer.

It is recognized that there are a profuse number of prior art techniques for measuring small magnetic fields based on the saturation characteristics of magnetic cores. Such prior art techniques however are invariably characterized by large scale complex electronic circuits, and require either very rigid control of the magnetic characteristics of the material utilized or elaborate compensating and balancing arrangements. Therefore, it is apparent that a general need has existed for some time for a simple, mechanically rugged, compact, sensitive magnetic field sensing device which requires only minimal power consumption for operation. These advantages are realized in the present invention by exploiting the characteristics of planar magnetic thin films, which are inherently sensitive to external magnetic fields because of their nonclosed flux paths. More specifically, the characteristic of the thin magnetic film which is utilized in the magnetometer transducer described herein is the thin film "hard" direction permeability dependence on an applied field component along the film "easy" direction.

Before proceeding with a detailed description of the present invention, it may be advantageous to review the basic thin film theory applicable to the films utilized in the present invention.

Thin magnetic films have been produced by depositing a nickel-iron alloy on a smooth substrate, such as glass, to a thickness of a few hundred to several thousand Angstroms. A number of deposition processes, including evaporation in a vacuum and electroplating may be employed. In the evaporative process the deposition of the magnetic material on a glass substrate may be made directly, whereas electroplating on a glass substrate requires the application of a conductive coating on the glass prior to deposition. In general, the characteristics discussed hereinafter apply to films deposited by either of these processes, although in electroplated films consideration must be given to the possible high-frequency eddy-current effects in the required conductive underlayer.

In general, predictable and stable magnetic properties of the films are obtained by choosing an alloy composition which yields minimum magnetostriction coefficient. For the nickel-iron film, the optimum composition appears to be approximately 83% Ni, 17% Fe. It has been found experimentally that if the actual composition of the films differs from this ratio by more than a few percent, the film magnetic properties are unduly sensitive to stresses induced by thermal expansion of the substrate or by external forces.

Films of thicknesses up to at least 3,000 Angstroms exhibit the capability of existing as a single domain, the magnetization of which can be rotated from a preferred or "easy" direction of magnetization by the application of external fields. This "easy axis" anisotropy is produced in the films by the presence of a large uniform field during the evaporation process which causes the magnetic domains of the alloy to align in a preferred direction.

The magnetic characteristic of thin films in the preferred direction exhibits a substantially rectangular hysteresis loop. In a direction transverse to the easy direction, often referred to as the "hard" direction or axis, the magnetic characteristic is a substantially linear loop. If the film sample under test is continually rotated from the easy to the hard direction, the magnetic characteristic changes from the square loop to the linear loop without interruption. Based upon these characteristics, two magnetic parameters $H_C$ and $H_K$ are obtained. $H_C$ is the coercive field value (coercivity) evaluated from the rectangular hysteresis loop in the easy direction; $H_K$ is the anisotropy field or saturation magnetization force in the hard direction. As distinguished from rotation, magnetic thin films may also exhibit magnetization reversal by domain wall motion in the presence of an easy direction applied field greater than the film coercive force, $H_C$. Single domains can only exist in these films if the size of the film spot is sufficiently large to keep the demagnetizing fields at the edges below the wall-motion threshold of, typically, one to two oersteds.

If a field is applied in the plane of the film perpendicular to the easy axis it is found that at a certain value of field strength the film magnetization in a given portion of the film is equally likely to return to the easy axis with positive and negative senses; consequently, the magnetization tends to split into multiple domains and the original single-domain state no longer exists until an easy-direction field exceeding $H_C$ is applied. In the analysis to follow it is assumed that the applied fields are restricted to values which yield rotation angles considerably less than 90 degrees.

The magnetization in a coherently rotatable single-domain film is aligned, in the plane of the film, at that angle to the easy axis which minimizes the free energy per unit volume.

The free energy E is given by the relationship $$E=K\sin^2\theta-\overline{H}_xM\cos\theta-\overline{H}_yM\sin\theta$$

Where $\theta$ is the angle of the magnetization vector M with respect to the film easy axis, $\overline{H}_x$ is the total easy direction field, $\overline{H}_y$ the total hard direction field (orthogonal to $\overline{H}_x$ in the plane of the film), and K the anisotropy constant. The anisotropy constant for a particular film is related to deposition conditions and film composition.

Setting the derivative $dE/d\theta$ from (1) equal to zero leads to $$2K\sin\theta\cos\theta+\overline{H}_xM\sin\theta-\overline{H}_yM\cos\theta=0$$

thus defining magnetization vector angular position as a function of the magnetic field environment.

If $\overline{H}_x=0$, Equation 1 reduces to $$\frac{2K}{M}\sin\theta=H_y$$

The value of $\overline{H}_y$ which yields $\theta=90°$ in (2) is defined as $H_K$, the anisotropy field constant where $$H_K=2K/M$$

This parameter, which is readily measured using a loop tracer, forms a convenient basis for normalizing the applied fields.

If $H_y=\overline{H}_y/H_K$, $H_x=\overline{H}_x/H_K$, the derivative of Equation 1 becomes $$\sin\theta\cos\theta+H_x\sin\theta-H_y\cos\theta=0 \quad (3)$$

Typical values of $H_K$ are 2 to 4 oersteds for the Ni–Fe films described herein.

In accordance with the present invention the inherent sensitivity of the magnetic thin films described hereinbefore, to external magnetic fields provides the basis for a magnetometer sensor. Appropriate means as will be described in detail herein, are provided for determining and presenting an external indication of the magnetization condition of the thin film transducer.

It will be apparent that because the thin films provide such an extremely small amount of magnetic material, the flux changes provided thereby are of very low amplitude. Therefore, a high rate of flux change is required to produce useful signal voltages. The high rate of flux change is achieved by the use of radio-frequency techniques which exploit the coherent rotational behavior of magnetization in a single-domain thin film.

If as taught in the present invention, a winding is placed on the thin film element in such a manner that it links the thin film hard direction flux, the small-signal inductance of said winding may be shown to be of the form $$L=L_A+K_1[H_K/\overline{H}_x+H_K]$$

where, $L_A$ is the leakage (air) inductance
$K_1$ is a coupling and film-flux coefficient
$\overline{H}_x$ is the applied steady-state easy direction field, and
$H_K$ is the film anisotropy field constant.

From this equation it can be seen that an approximately linear relationship exists between inductance change and field change, if the field change is not too large. Measurement of an ambient field may be accomplished by using the thin film inductance as part of a resonant tank circuit in conjunction with circuits which produce an output proportional to changes in the resonant frequency of the tank. In general, such an output may be derived from any variation of the tank impedance either in a constant frequency mode or as the controlling influence for varying the frequency of an oscillator.

It is therefore a general object of the present invention to provide an improved magnetometer.

Another object of the present invention is to provide a magnetometer which utilizes a thin film of ferromagnetic material as a transducer.

Still another object of the invention is to provide a thin film magnetometer characterized by simple electronic circuits, very low power consumption, good sensitivity, and selective response to a predetermined component of applied field.

A more specific object of the present invention is to provide a thin magnetic film magnetometer which exploits the thin film field dependent inductance as a reactive component in a tuned resonant circuit.

These and other features of the invention will become more fully apparent from the following description of the annexed drawings, wherein.

Figure 1:
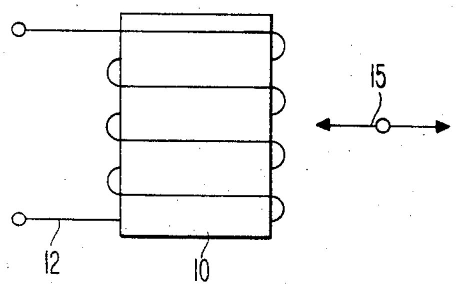
FIG. 1 is a pictorial representation of the basic field sensitive transducer comprising a ferromagnetic thin film element in relation to an inductor winding coupled thereto, as employed in the practice of the invention.

With reference to FIG. 1, if a winding 12 is placed around a thin magnetic film 10 in such a manner that the coil axis coincides with the hard-direction axis of magnetization, the inductance is found to be dependent upon the static magnetic environment to which the film is subjected. The easy axis or preferred direction of the film is indicated by the doubleheaded arrow 15. When an RF exciting current applied to the winding 12 is maintained at a level which limits the perturbation of the film magnetization vector angle $\theta$ to a few degrees, and if the static fields are confined to values less than the anisotropy field $H_K$ or the coercive force $H_C$, the inductance variation is predictable and reversible.

Figure 2:
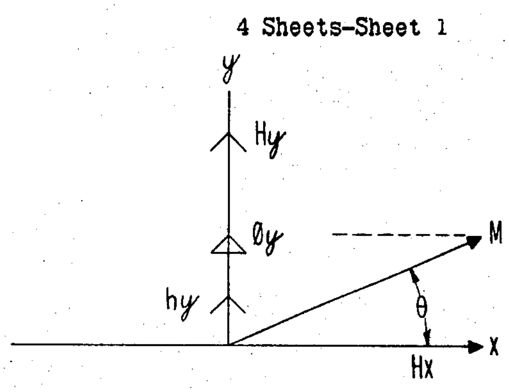
FIG. 2 is a vector diagram illustrating the coordinate system utilized for inductance variation analysis.

The inductor of FIG. 1 may be considered to contain an "air" inductance $L_A$ in series with a film-dependent inductance $L_F$, the relative magnitudes being determined by the degree of coupling to the film and by the portion of the film flux which coincides with the coil axis. As shown in FIG. 2, the latter component is given by $\phi y$, where, $$\phi y=M\sin\theta \quad (4)$$

By the basic definition of inductance, $$L_F=N\frac{d\phi y}{dI}=K\frac{d}{dh_y}(M\sin\theta)=K_1\cos\theta\frac{d\theta}{dh_y} \quad (5)$$

Here, $\overline{h}y$ is the small RF field produced by the inductor winding. The film inductance is dependent on the normalized static fields $H_x$ and $H_y$ shown in FIG. 2. To determine this dependence, it is necessary to express $\theta$ and $d\theta/dh_y$ as functions of $H_x$ and $H_y$.

Using the normalized free-energy equation $$E=\frac{1}{2}\sin^2\theta\frac{\overline{H}_x}{H_K}\cos\theta-\frac{\overline{H}_y}{H_K}\sin\theta \quad (6)$$

and its derivative $$\frac{dE}{d\theta}=0=\sin\theta\cos\theta+\frac{\overline{H}_x}{H_K}\sin\theta-\frac{\overline{H}_y}{H_K}\cos\theta$$

and defining $\overline{H}_x/H_K=H_x$, $\overline{H}_y/H_K=H_y$, $\overline{h}_y/H_K=h_y$, we obtain $$f(\theta, h_y)=\sin\theta\cos\theta+H_x\sin\theta-(H_y+h_y)\cos\theta=0 \quad (7)$$

This Expression 7 may be differentiated implicitly, giving $$L_F=K_1\cos\theta\frac{d\theta}{dh_y}=-K_1\cos\theta\frac{dF/d\theta}{dF/dh_y}$$

$$L_F=\frac{K_1\cos^2\theta}{\cos 2\theta+H_x\cos\theta+(H_y+h_y)\sin\theta} \quad (8)$$

Since $h_y$ is small with respect to unity, only the static terms $H_y$ and $H_x$ need be considered. Furthermore, with the approximations $$\cos\theta=1-\theta^2/2$$

and $\sin\theta=0$, and the identities $\cos 2\theta=1-2\sin^2\theta$ and $\cos^2\theta=1-\sin^2\theta$, Equation 8 becomes $$L_F=\frac{K_1(1-\theta^2)}{(1-2\theta^2)+H_x(1-\theta^2/2)+H_y\theta}$$

The parameter $\theta$ may be eliminated by using Equation 7 and the approximations $\cos\theta=1$, $\sin\theta=\theta$, yielding $$\sin\theta=\theta=\frac{H_y}{1+H_x} \quad (9)$$

Note that expression (9) is reasonably accurate for angles up to 30 degrees. However, if (9) is differentiated directly to find $d\theta/dh_y$, considerable error is incurred even for small angles.

Substituting for $\theta$ in (8) according to (9), and combining terms, provides an expression for $L_F$, in terms of $H_y$ and $H_x$ only, of the form $$L_F \cong K_1 \frac{(1+H_x)^2 - H_y^2}{(1+H_x)^3 - (1-H_x/2)H_y^2} \quad (10)$$

Two important cases for (10) are those of $H_x=0$ and $H_y=0$. For $H_y=0$, $$L_F = K_1 \frac{1}{1+H_x} \quad (11)$$

For $H_x=0$, $$L_F = K_1 \frac{1-H_y^2}{1-H_y^2} = K_1 \quad (12)$$

Figure 3:
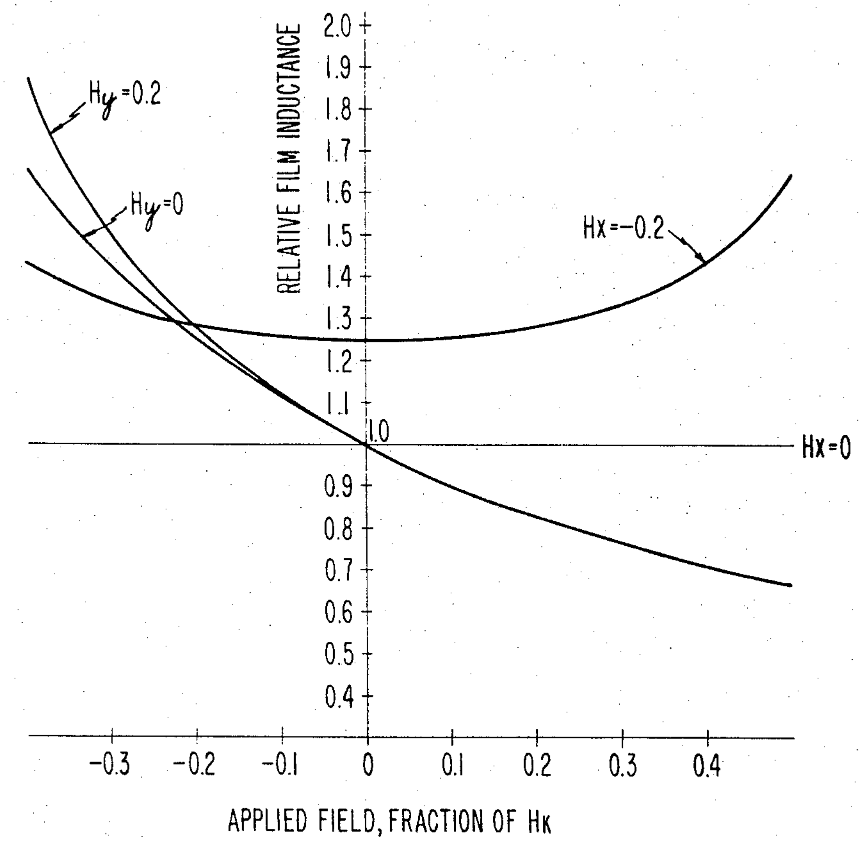
FIG. 3 is a graph depicting the theoretical inductance variation for magnetic fields applied to the thin film transducer of FIG. 1.

As indicated by the limiting equations and as shown in the plots of FIG. 3, the thin film inductance change sensitivity is predominantly confined to the $H_x$ field components, which is essential for an operational single axis magnetometer. More specifically, the sensitivity to field components normal to the film plane ($H_Z$) are negligible due to shape anisotropy effects incurred by the high ratio of film area to film thickness and no sensitivity to $H_y$ field components exists unless some $H_x$ component is present. For small $H_y$ field magnitudes the effect of the $H_y$ field is negligible for all $H_x$ fields, as illustrated by the fact that the slope of the inductance versus hard direction field characteristic ($dL/hH_y$) is zero at zero $H_y$, independent of $H_x$. The greatest sensitivity to $H_y$ components is also seen to occur in the presence of negative $H_x$ components.

Thus for applied fields having a magnitude equal to a small percentage of $H_K$, the inductance change effect is proportional to the field magnitude and to the cosine of the angle between the field vector and the thin film easy direction, with complete spherical symmetry.

An important extension of the preceding considerations of FIG. 3 should be noted. The thin film transducer may be incorporated into a practical system supplying an easy axis correcting-field feedback that opposes the easy axis component of applied field and maintains a net zero easy axis field at the thin film. In this case, the single axis magnetometer characteristic is enforced and is independent of the magnitude of the applied field for levels very much greater than the anisotropy field $H_K$.

As is apparent from the foregoing analysis, any of the common means for measuring inductance may be utilized in obtaining from the thin film transducer an output which is related to the magnetic field environment. For example, a constant frequency, constant amplitude drive current may be applied to the inductor and the voltage across the inductor monitored. This approach yields low sensitivity because the fractional impedance magnitude change is in one-to-one correspondence with fractional inductance change.

In a more practical configuration, the thin film controlled inductor is placed in parallel with a capacitor, thereby yielding a tank circuit for which the resonant frequency is a function of the easy axis component of applied field. As mentioned hereinbefore, circuits must then be provided which will produce an output signal proportional to changes in the tank impedance which, of course, is related to a variation in the resonant frequency of the tank circuit. More specifically, the tuned resonant circuit can then be employed either as the frequency determining tank circuit of an oscillator, operating typically in the 10 to 20 mc. region, as described in FIG. 4, or the resonant circuit may be used as a filter which will provide a phase shift proportional to magnetic field strength when driven from a fixed frequency source of oscillations. This latter configuration is described generally in FIG. 5 and is exemplified in the practical schematic diagrams of FIGS. 6 and 7.

Figure 4:
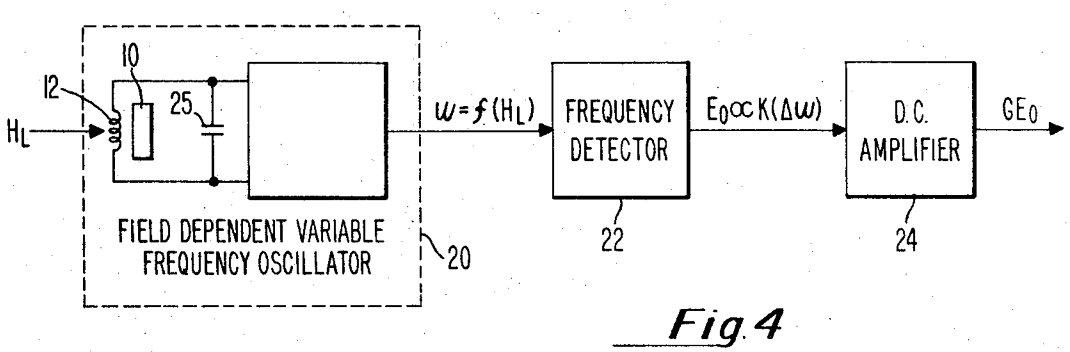
FIG. 4 is a block diagram illustrating one possible magnetometer system employing the thin film transducer of FIG. 1 in a variable frequency mode of operation.

The block diagram of FIG. 4 depicts a magnetometer system utilizing the thin magnetic film transducer in the tank circuit of an oscillator for controlling the frequency thereof.

Block 20 depicts an oscillator, many varieties of which, including the classic Hartley and Colpitts circuits, are well known in the electronics art. The basic frequency of such oscillators approximates the resonant frequency of a tuned circuit. In the present invention, the tuned circuit consists of the magnetic thin film element 10 and inductor 12 as illustrated in FIG. 1, and a capacitor 25. In accordance with the analysis of inductance variation with applied fields as presented hereinbefore in connection with FIGS. 1 and 2, the presence of a small field $H_L$ directed along the easy axis of the thin film causes a change in the resonant frequency of the oscillator tuned circuit. This in turn results in a corresponding change in the frequency, $\omega$, of the output signal from the oscillator, whereby $\omega=f(H_L)$.

The output of the oscillator is applied to block 22, Frequency Detector. The latter may utilize any of several methods for producing an output signal proportional to the input frequency. A well-known detector is the phase-shift discriminator, commonly known as the Foster-Seeley discriminator. (Reported by D. E. Foster and S. W. Seeley in "Automatic Tuning Simplified Circuits and Design Practice," Proceedings of the IRE, vol. 25, p. 289, March 1937.) Another detector which is a modification of the former and is often used, is the ratio detector. Still a third type of detector used in measurement work where a very linear relation is required between the detector output and the variations in the instantaneous frequency, is a cycle-counting type of frequency meter. Such an instrument develops an output current exactly proportional to the instantaneous frequency, and is described in "Electronic Measurements" by Terman and Pettit on p. 223, McGraw-Hill Book Co., Inc., N.Y., 1952. It is apparent that the Frequency Detector 22, may comprise any one of many well-known circuits.

The instantaneous output $E_0$ of the detector, as shown in FIG. 4, is proportional to the actual input frequency as controlled by the field applied to the thin film transducer and is expressed, $E_0 \propto K(\Delta\omega)$ where K is the proportionality factor.

It is possible to utilize the output directly from the detector 22, but in many applications it is necessary, or at least desirable, to amplify the signal. Block 24 depicts a D.C. amplifier of suitable type to provide the desired amplified output, designated $GE_0$, where G is the gain of the amplifier.

On the basis of experimental results, it appears the thin film may be caused to contribute approximately one-half of the total winding inductance. Moreover, if the anisotropy field of the film $H_K$ is equal to approximately 3 oersteds, a fractional inductance change of 1/6 per oersted is realizable. The change $\Delta\omega$ in resonant frequency $\omega_0$ corresponding to a given small inductance change $\Delta L$ as compared to the total inductance $L_T$ may be shown to be $$\frac{\Delta\omega}{\omega_0} \approx -\frac{1}{2}\frac{\Delta L}{L_T}$$

Thus, a fractional inductance change of 1/6 per oersted results in a fractional change of 1/12 per oersted, or $8.3\times10^{-5}$ per millioersted. Related to frequency, if the oscillator has a resonant frequency of 10 mc., a change of 830 c.p.s./millioersted occurs. A frequency change of this order of magnitude is readily detectable by any of the frequency detection schemes mentioned hereinbefore.

It should be emphasized that the use of a thin film controlled tank circuit to control the frequency of an oscillator may be realized in configurations other than that presented by way of example in FIG. 4. Thus, the signal generated by the oscillator may be heterodyned with a signal generated by a fixed frequency reference oscillator.

The difference frequency generated by this arrangement will vary with the magnetic field sensed by the thin film. Here again, because of the inherent precision with which frequency measurements can be made, this approach is potentially capable of a high degree of sensitivity and accuracy.

Figure 5:
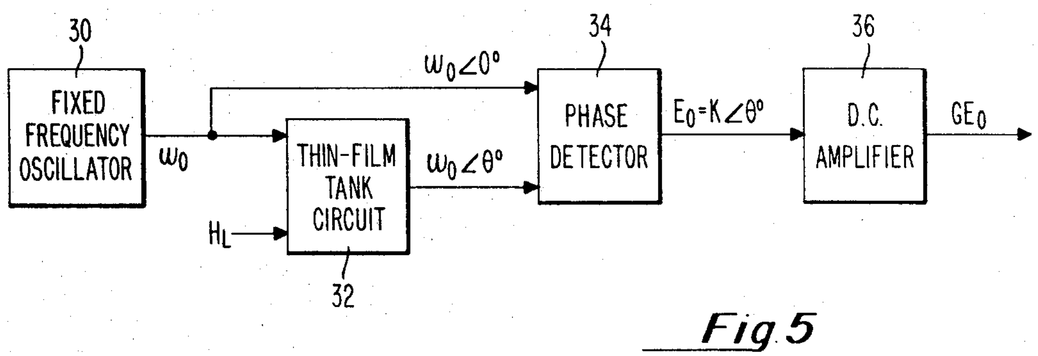
FIG. 5 is a block diagram illustrating another possible magnetometer configuration employing the thin film transducer of FIG. 1 in a phase-variation mode of operation.

The magnetometer sensor illustrated in block form in FIG. 5 is immediately distinguishable from that of FIG. 4 in that the oscillator frequency remains fixed rather than varies in response to the sensed field.

Thus, block 30 represents an oscillator operating at a fixed frequency $\omega_0$ and capable of supplying an output current to block 32 Thin Film Tank, which comprises an inductor winding coupled to a thin magnetic film as illustrated in FIG. 1, together with a capacitor in parallel with the inductor winding to form a tuned circuit. The output signal from the oscillator $\omega_0 < O^0$ is also coupled directly to a Phase Detector 34. The output signal $\omega < \theta_0$ of the Thin Film Tank 32 is shifted in phase from the input signal by an angle related to the magnitude of the external field HL sensed along the easy or preferred axis of the thin film element. Thus $$\Delta\theta = f\left(\frac{\omega_0}{\omega}\right) = f(H_L)$$

The phase shifted output from the thin film tank is also applied to the Phase Detector 34. It should be noted that the Phase Detector 34 may conveniently be of the type mentioned in connection with FIG. 4. The Foster-Seeley discriminator, for example, is admirably suited for direct phase detection in translating inductance variation into a DC output signal, $E_0$. A DC Amplifier 36, may be employed if desired to amplify the signal from the Phase Detector 34.

In the calculation of phase change at constant frequency, as in the magnetometer of FIG. 5, the Q of the tank associated with the thin film element must be considered. It has been found that the phase angle change is related to the resonant frequency change approximately by $$\Delta\theta = Q\frac{\Delta\omega}{\omega_0}$$

For a Q of 50, the phase shift at $\omega_0$, the resonant frequency, produced by an applied field of 1 millioersted is $\Delta\theta = 50\ (8.33\times10^{-5}) = 4.166\times10^{-3}$ radians$=0.24$ degree. This shift represents an output of 4.166 millivolts, referred to a peak output ($\Delta\theta=90°$) of 1 volt, in a phase detector producing a DC output proportional to sin $\Delta\theta$.

Figure 6:
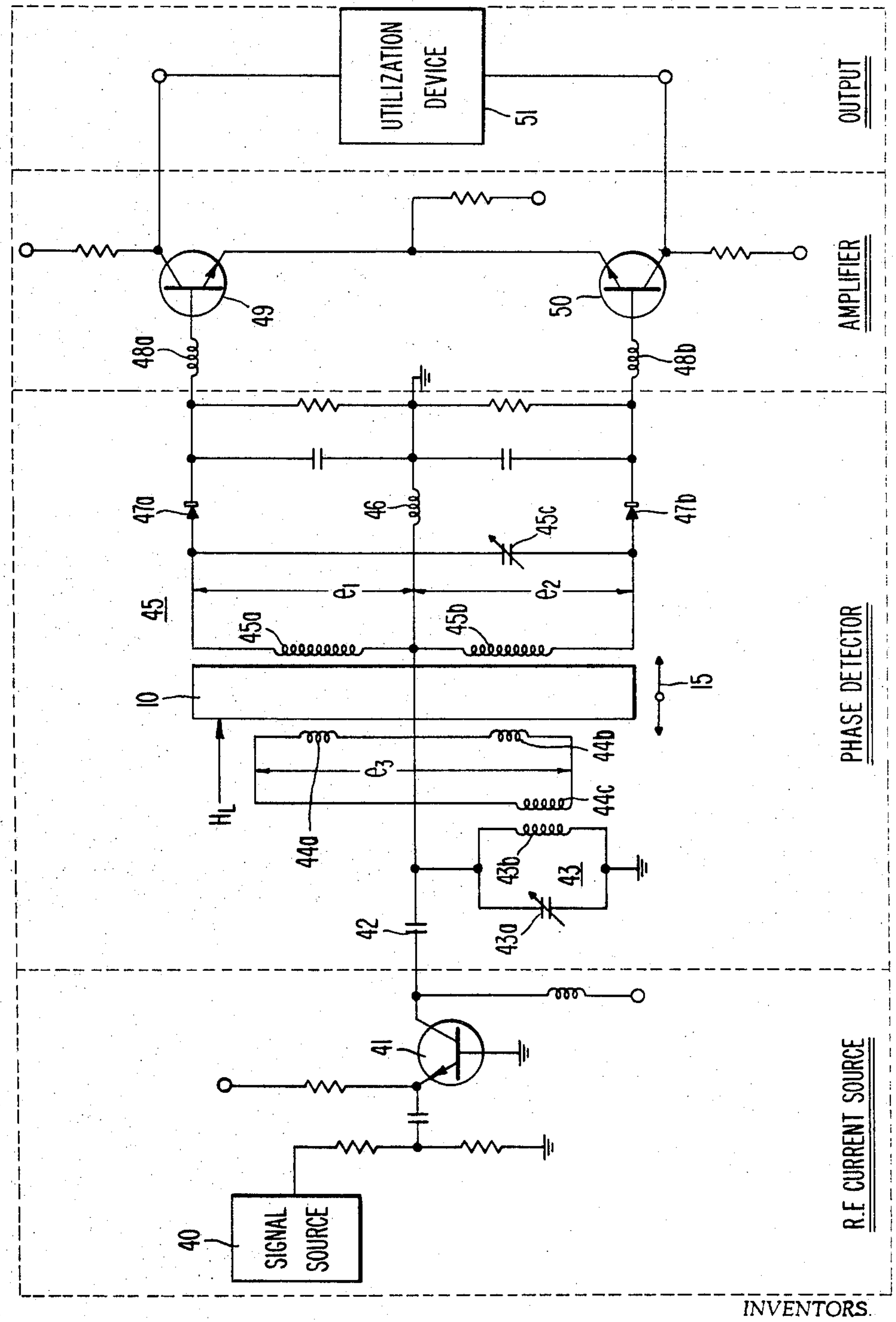
FIG. 6 is a schematic diagram of an actual operative basic magnetometer system of the phase-variation type substantially as depicted in FIG. 5.

FIG. 6 is a schematic diagram of an actual operative magnetometer utilizing the general configuration of the fixed-frequency, phase variation arrangement of FIG. 5.

Referring to FIG. 6, the magnetometer comprises four basic sections, namely, radio frequency current source, phase detector (discriminator), amplifier and utilization device.

The radio frequency current source includes a signal voltage generator 40 and transistor 41 which serves as a current source. The phase detector portion of the magnetometer is based upon the Foster-Seeley discriminator mentioned hereinbefore. In operation, the radio frequency current is coupled by capacitor 42 to a tuned circuit 43 which includes capacitor **43*a* and winding 43*b* and which circuit is resonant at the frequency of the signal source 40. Circuit 43 may be referred to as the primary resonant circuit. Tuned circuit 45, comprising windings 45*a*, 45*b* and capacitor 45*c*, is also resonant at the frequency of the signal source 40. Circuit 45 may then be referred to as the secondary resonant circuit. In the typical Foster-Seeley discriminator, the primary and secondary circuits are inductively coupled. This is also true of the present configuration, with the significant difference that the inductive coupling includes a magnetic thin film element 10 of the character described above. Also, instead of coupling the primary winding 43*b* directly with the secondary windings 45*a* and 45*b*, a linking circuit 44 comprising windings 44*a*, 44*b* and 44*c* was interposed therebetween. This mode of coupling was found to result in somewhat better circuit operation, although the more conventional coupling is also satisfactory. The windings 44*a* and 44*b* are in effect the primary windings of the discriminator transformer. Each of the latter windings is wound around the thin magnetic film element in such a manner that the axis of the windings are parallel to the hard axis of the thin film element. Secondary windings, 45*a* and 45*b* are also wound about the thin film element 10** with the same physical orientation as the primary windings.

The center of the secondary of the discriminator transformer, that is, the point between windings **45*a* and 45*b*, is connected to the top or high potential side of the primary resonant circuit 43**.

Assuming that there is no external field applied to the thin film in the easy direction, then at the resonant frequency of the tuned secondary circuit, the voltages $e_1$ across the winding **45*a* and $e_2$ across 45*b* are in quadrature with the voltage $e_3$ existing across the windings 44*a* and 44*b*. If a field is applied to the thin film in the easy direction, the change in film permeability results in a detuning of the discriminator transformer. Under these circumstances, the phase position of $e_1$ and $e_2$ relative to $e_3$ will differ from 90°. Moreover the resultant voltages appearing respectively on the anodes of diodes 47*a* and 47*b***, which were equal in amplitude at resonance, now become unbalanced with the detuning of the discriminator transformer. Thus depending upon the actual displacement from resonance, the amplitude of one of the voltages applied to a diode becomes larger in amplitude, while the other becomes smaller.

The two voltages developed by the discriminator are separately rectified by the diodes **47*a* and 47*b* to produce output voltages which reproduce the amplitudes of the voltages applied to the respective anodes. The detector output voltage is the arithmetic difference between the rectified voltages developed by the individual diodes. RF choke 46 provides a return path for the DC component of the rectified current flowing through diodes 47*a* and 47*b***.

The output of the diodes is coupled respectively through isolating RF chokes **48*a* and 48*b* to transistors 49 and 50, which transistors function as a difference amplifier. The outputs of the transistors are then applied to a utilization device 51**, which in its simplest form may be an indicating device such as a galvanometer.

In an actual operative embodiment of this invention employing the schematic of FIG. 6, the following parameters were employed successfully. The basic thin film inductance transducer was made using a magnetic film element in the form of a rectangle, 1 inch by 3 inches, about 2000 Angstrom units thick, of nickel-iron alloy, vacuum deposited on a glass substrate. The film-substrate combination was wound with 20 turns of #19 wire in such a manner that the coil axis was parallel to the hard direction of magnetization of the film element. With the anisotropy field $H_K$ equal to 3 oersteds, phase angle sensitivities of 150° to 200° per oersted have been measured. These latter figures are in excellent agreement with sensitivities predicted by a simple analytical model incorporating readily determined tank circuit parameters.

If the utilization device in FIG. 6 is a 75 microampere galvanometer (with 0 reading center scale), a phase detector output sensitivity of $\pm0.5$ volt/oersted is indicated for small values of $H_L$ applied to the film. When the phase detector output is amplified through the difference amplifier, including transistors 49 and 50, with a conservative gain of 11, the resulting sensitivity is $\pm5.5$ volts/oersted. A more effective amplifier would of course, provide a correspondingly higher final sensitivity.

It should be emphasized that the foregoing dimensions and amplitudes given for the embodiment described, may vary according to the material, design or application, and are included solely for purposes of example.

Figure 7:
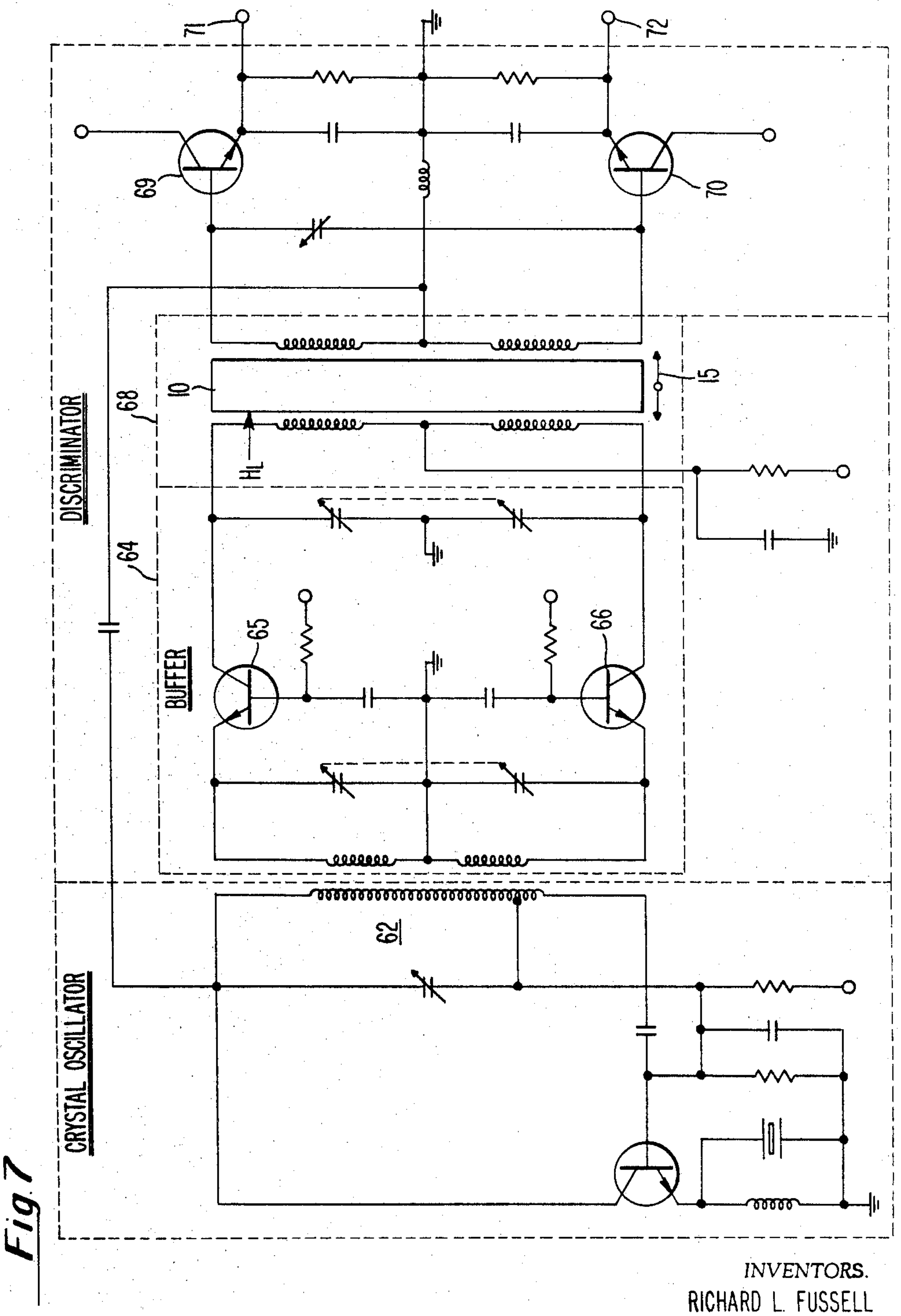
FIG. 7 is a schematic diagram of another magnetometer configuration similar in function to that depicted in FIG. 6 but differing in circuit configuration.

FIG. 7 illustrates another complete magnetometer sensor system which provides an output voltage proportional to a magnetic field component along the easy axis of the thin film transducer. The system is composed of a crystal controlled transistor oscillator and the thin film phase discriminator. A balanced buffer stage, emitter followers and thin film tuned transformer function as integral parts of the discriminator.

The overall circuit operation is similar to that described in connection with FIG. 6. The basic detector illustrated is again, the Foster-Seeley discriminator, the operation of which was explained generally in FIG. 6. A more complete description of the Foster-Seeley discriminator may be had by referring to the Foster-Seeley Proceedings of the IRE article referenced above.

Additionally, the text "Electronic and Radio Engineering" by Frederick E. Terman, Sections 17–6 and 17–7, pp. 605–614 inclusive, McGraw-Hill, 1955 contains a highly comprehensive treatment of both the Foster-Seeley discriminator and the ratio detector, in their roles of detecting frequency and phase modulated waves.

The magnetometer sensor of FIG. 7 differs structurally from that of FIG. 6 in the following particulars. The two-stage RF current source of FIG. 6 has been replaced by a crystal oscillator. The tank circuit for the oscillator and the primary tuned circuit of the discriminator have been combined into a single tank circuit 62 which serves both functions. A buffer stage 64 has been interposed between the primary tuned circuit and the thin film transformer. This buffer stage 64 includes a pair of transistors 65 and 66 operated in a Class B push-pull mode to permit high impedance, high signal level, balanced operation of the thin film transformer transducer 68. Lastly the diode rectifiers of FIG. 6 have been replaced by transistors 69 and 70 connected as emitter followers and designed to simultaneously provide the rectification necessary for discriminator action while maintaining a high impedance condition for the comparison section of the discriminator. The differential output may be utilized directly from terminals 71 and 72, or alternately a differential amplifier as described in FIG. 6 may be interposed between the output of the detector and the utilization device.

In an actual operative embodiment of the magnetometer sensor of FIG. 7, the circuit operating into a 10K load with 100 pf. filter capacity, yielded a sensitivity of 8 volts per oersted, with a current drain of 1.7 ma. from the +3 volt supply. A differential amplifier with a gain of 50, when driven by the 1K output impedance of the sensor, provided an overall sensitivity of 250 volts per oersted into a 5K load and could provide perceptible changes on a 75 μa. galvanometer for applied field changes of $5\times10^{-5}$ oersted.

Figure 8:
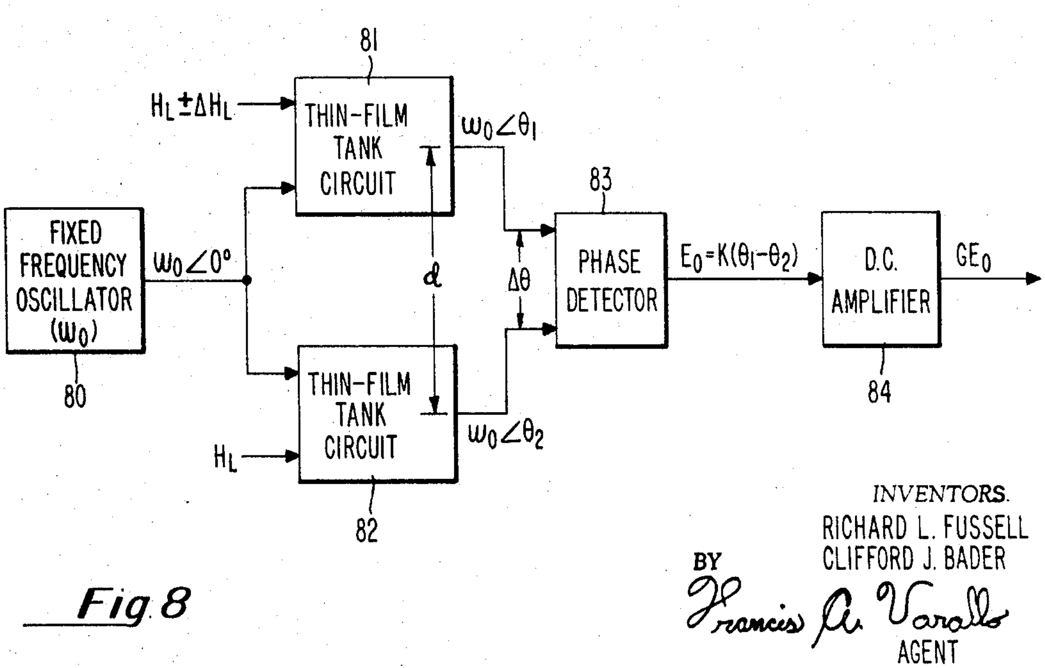
FIG. 8 is a block diagram depicting the use of a pair of the thin film transducers of FIG. 1 in a gradient sensing magnetometer system.

FIG. 8 depicts in block form a gradient field sensing magnetometer using the inductance variation technique. In effect, the sensing of gradient fields is merely a special case of field magnitude measurement described in FIG. 5 involving comparison between two transducers spaced a predetermined distance apart.

In the illustration of FIG. 8, two spaced thin film inductors 81 and 82 are being used as series filters fed from a common oscillator 80, and providing the two inputs to a phase detector or comparator 83. It is apparent that so long as the field conditions are uniform at both transducers, the filter resonant frequencies will be identical, although shifted from the zero field values. Consequently there will be equal phase shifts through both filters 81 and 82, and no output from the phase detector 83. For a difference in fields, there will be a difference in phase shifts, which will cause a detector output directly related to the existing field difference. Thus the phase detector senses $$\Delta\theta=\frac{K\Delta HL}{d}$$

where $d$ is the distance between transducers. The final output is represented by $$E_0=K_\phi G_v K\left(\frac{\Delta HL}{d}\right)$$

providing a signal which is a linear function of the field gradient.

It will be apparent from the foregoing description of the invention and its mode of operation that there is provided an improved magnetometer utilizing the inductance variation characteristics of a thin magnetic film as a transducer. It should be understood that modifications of the arrangements described herein may be required to fit particular operating requirements. For example, various well-known feedback techniques may be incorporated in the magnetometers described hereinbefore and these, while unnecessary in many applications, will give increased performance for certain specialized tasks. Therefore such modifications will be apparent to those skilled in the art. The invention is not considered limited to the embodiments chosen for purpose of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A magnetometer comprising a source of fixed radio frequency current, a phase-shift discriminator comprising first and second tuned circuits resonant at said fixed frequency, a thin magnetic film element interposed between said tuned circuits in such a manner that said circuits are inductively coupled in common to said thin film element and to each other, said film element being capable of assuming opposed states of residual flux density along a preferred axis of magnetization, said film element being magnetized in a predetermined one of said states and acting substantially as a single large domain of said predetermined state, circuit means for coupling said radio frequency current into both said first and second tuned circuits, the value of the hard axis permeability of said magnetic film element varying in response to an external magnetic field component sensed by said magnetic film element along said preferred axis of magnetization, said second tune circuit being detuned from resonance by an amount proportional to the change in permeability in said magnetic film element, the amplitudes of the instantaneous output signals appearing across said second tuned circuit being a function of the magnitude of the magnetic field sensed by said magnetic film element, and unidirectional current conducting means coupled to said second tuned circuit for rectifying said output signals.

2. A magnetometer as defined in claim 1 further including a D.C. amplifier coupled to said phase detector second tuned circuit for amplifying the output signals therefrom.

3. A magnetometer comprising a source of fixed radio frequency current, a phase shift discriminator comprising first and second tuned circuits resonant at said fixed frequency, said first tuned circuit comprising an inductor winding and a capacitor connected in parallel, said second tuned circuit comprising a pair of inductor windings each having an outer terminal and a common center terminal and a capacitor connected in parallel across said pair of windings, a linking circuit having in series a first winding inductively coupled to said inductor winding of said first tuned circuit and a second and a third winding, a magnetic element capable of assuming opposed states of residual flux density along a preferred axis of magnetization, said magnetic element being magnetized in a predetermined one of said states and acting substantially as a single large domain of said predetermined state, said magnetic element being interposed between said first and second tuned circuits in such a manner that said second and third windings of said linking circuit and said pair of windings of said second tuned circuit are coupled in common to said magnetic element and to one another, capacitive means for coupling said radio frequency current from said source thereof to said inductor winding of said first tuned circuit and to the center terminal of said pair of inductor windings of said second tuned circuit, the value of the hard axis permeability of said magnetic element varying in response to an external magnetic field component sensed by said magnetic element along said preferred axis of magnetization, said second tuned circuit being detuned from resonance by an amount proportional to the change in permeability in said magnetic element, the amplitudes of the instantaneous output signals appearing across said second tuned circuit being a function of the magnitude of the magnetic field sensed by said magnetic element, and unidirectional current conducting means coupled to said second tuned circuit for rectifying said output signals.

4. A magnetometer as defined in claim 3 further including a differential amplifier coupled to said unidirectional current conducting means, and a utilization device coupled to said differential amplifier.

5. A magnetometer comprising a crystal controlled oscillator for generating radio-frequency signals, a phase-shift discriminator, a first tuned circuit resonant at the crystal frequency of said oscillator and being common to both said oscillator and said discriminator, a second tuned circuit of said discriminator resonant at said crystal frequency, said first tuned circuit comprising an inductor winding and a capacitor connected in parallel, said second tuned circuit comprising a first center-tapped winding having a pair of outer terminals and a capacitor connected in parallel thereacross, a linking circuit comprising a second and a third center-tapped winding each having a pair of outer terminals, first and second transistors each having an input, output and control electrode, the input and output electrodes of each of said transistors being connected respectively to the outer terminals of said second and third center-tapped windings, the control electrodes of said transistors being coupled to a source of bias potential, a magnetic element capable of assuming opposed states of residual flux density along a preferred axis of magnetization, said magnetic element being magnetized in a predetermined one of said states and acting substantially as a single large domain of said predetermined state, said magnetic element being interposed between said first and second tuned circuits in such a manner that said third center-tapped winding of said linking circuit and said first center-tapped winding of said second tuned circuit are coupled in common to said magnetic element and to each other, said radio frequency signals appearing across the inductor winding of said first tuned circuit and being capacitively coupled to the tap of said first center-tapped winding, the value of the hard axis permeability of said magnetic element varying in response to an external magnetic field component sensed by said magnetic element along said preferred axis of magnetization, said second tuned circuit being detuned from resonance by an amount proportional to the change in permeability in said magnetic element, the instantaneous amplitudes of the output signals appearing respectively on said outer terminals of said first center-tapped winding of said second tuned circuit being a function of the magnitude of the magnetic field sensed by said magnetic element, and third and fourth transistors connected as emitter followers and being coupled respectively to said outer terminals of said first center-tapped winding for rectifying said output signals.

6. A magnetometer as defined in claim 5 further characterized in that said magnetic element is a thin film of a nickel-iron alloy composed substantially of 83% nickel and 17% iron, and having a thickness of approximately 2000 Angstrom units.

References Cited

UNITED STATES PATENTS

| | | | |
|---|---|---|---|
| 2,943,306 | 6/1960 | Gray et al. | |
| 3,239,754 | 3/1966 | Odom et al. | 324—47 |

ARCHIE R. BORCHELT, *Primary Examiner.*

R. J. CORCORAN, *Assistant Examiner.*